US008579364B2

(12) United States Patent
Fukudome et al.

(10) Patent No.: US 8,579,364 B2
(45) Date of Patent: Nov. 12, 2013

(54) WORK VEHICLE

(75) Inventors: Hiroki Fukudome, Sakai (JP); Naoya Tsuda, Sakai (JP); Kenzo Ushiro, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 12/054,747

(22) Filed: Mar. 25, 2008

(65) Prior Publication Data
US 2008/0238147 A1 Oct. 2, 2008

(30) Foreign Application Priority Data

Mar. 28, 2007 (JP) ................................. 2007-085527

(51) Int. Cl.
*B62D 25/06* (2006.01)
*B62D 25/07* (2006.01)

(52) U.S. Cl.
USPC .................. 296/190.08; 296/190.03; 296/213

(58) Field of Classification Search
USPC .......... 296/102, 190.03, 190.04, 213, 190.01, 296/190.08; 180/89.12
See application file for complete search history.

(56) References Cited

U.S. PATENT DOCUMENTS

| | | | | |
|---|---|---|---|---|
| 4,503,749 A * | 3/1985 | Kuhn et al. | ................... | 454/136 |
| 4,600,236 A * | 7/1986 | Weiss et al. | ............. | 296/190.03 |
| 5,071,187 A * | 12/1991 | Smith et al. | .................... | 296/102 |
| 5,695,238 A * | 12/1997 | Calamari et al. | ............. | 296/210 |
| 6,186,584 B1 * | 2/2001 | Samuelson et al. | ........... | 296/213 |
| 6,189,955 B1 * | 2/2001 | Fryk et al. | ................ | 296/190.08 |
| 6,309,012 B1 * | 10/2001 | Fryk et al. | ..................... | 296/211 |
| 6,464,291 B2 * | 10/2002 | Hynds et al. | .................. | 296/213 |
| 6,554,351 B1 * | 4/2003 | El-Zein | ..................... | 296/190.08 |
| 6,702,370 B2 * | 3/2004 | Shugar et al. | .................. | 296/211 |
| 6,780,097 B2 * | 8/2004 | Shuttleworth et al. | ........ | 454/136 |
| 6,883,846 B2 * | 4/2005 | Cheek et al. | .................. | 296/1.02 |
| 7,032,703 B2 * | 4/2006 | Wulfert et al. | ................ | 180/329 |
| 7,131,687 B2 * | 11/2006 | Yokoo et al. | .............. | 296/190.08 |
| 7,252,585 B2 * | 8/2007 | Ichikawa et al. | .............. | 454/137 |
| 7,306,280 B1 * | 12/2007 | Kraimer | ................... | 296/190.03 |
| 7,338,113 B2 * | 3/2008 | Hiraoka | ................... | 296/190.03 |
| 7,472,945 B2 * | 1/2009 | Miura | ...................... | 296/190.03 |

(Continued)

FOREIGN PATENT DOCUMENTS

| | | |
|---|---|---|
| JP | 06-032188 | 2/1994 |
| JP | 08332907 A | 12/1996 |
| JP | 2001058553 A | 3/2001 |

(Continued)

*Primary Examiner* — Glenn Dayoan
*Assistant Examiner* — Gregory Blankenship
(74) *Attorney, Agent, or Firm* — The Webb Law Firm

(57) ABSTRACT

A work vehicle includes a front loader mounted at a front portion of the work vehicle to be vertically pivotable, a driving control device, and a canopy device for covering the driving control device from above, the canopy device including a roof disposed upwardly of the driving control device and a support body for supporting the roof. The roof includes a front visor portion which projects, in a plan view thereof, to a position same as or more forwardly of a front end portion of the driving control device. To a lower face of said front visor portion, there are attached a pair of right and left front illumination lamps, and there is provided an upper concave portion at the right/left center thereof. A lower face of the upper concave portion is formed as an inclined face which is inclined upward from a rear portion to a front edge of the front visor portion so as to be located at a higher position than the attaching position of the front illumination lamps.

7 Claims, 16 Drawing Sheets

(56) References Cited

U.S. PATENT DOCUMENTS

| | | | |
|---|---|---|---|
| 7,731,273 B2 * | 6/2010 | Hagele et al. | 296/190.1 |
| 2003/0230447 A1 * | 12/2003 | Wulfert et al. | 180/329 |
| 2006/0220419 A1 * | 10/2006 | Miura | 296/190.03 |
| 2007/0205633 A1 * | 9/2007 | Waco et al. | 296/190.09 |
| 2009/0108636 A1 * | 4/2009 | Hanson et al. | 296/213 |
| 2009/0266099 A1 * | 10/2009 | Bruss et al. | 62/285 |

FOREIGN PATENT DOCUMENTS

| | | |
|---|---|---|
| JP | 2001271384 A | 10/2001 |
| JP | 2003113622 A | 4/2003 |
| JP | 2004359006 A | 12/2004 |

* cited by examiner

WORK VEHICLE

BACKGROUND OF THE INVENTION

1. Field of the Invention

The present invention relates to a work vehicle such as a TLB (a tractor with a front loader and a backhoe), a tractor, etc; and more particularly to a canopy device for use in such a work vehicle.

2. Description of the Related Art

Conventionally, as a work vehicle, there is known one provided with a canopy device having a box shaped frame structure consisting of a pair of right and left front posts, a pair of right and left rear posts, and an upper frame structure consisting of an upper front frame, a pair of right and left upper frames and an upper rear frame, and a roof mounted on the frame structure so as to cover a driving control device from above. In this type of work vehicle, the front posts, the rear posts, the upper front frame, the upper frames and the upper rear frame of the frame structure are formed straight and the roof is formed flat. Then, when the front loader is pivoted to set a posture of setting a bucket attached to the leading end of the loader to the uppermost position, the front end of the roof will be located on the line of sight of a driver seated at the driver's seat to visually recognize this bucket, so that the front end of the roof interferes with the line of sight of the driver who looks up the bucket at its uppermost position.

As a work vehicle capable of solving such a problem as above, e.g. JP6-0322188 A discloses a canopy device wherein the upper end portions of the front posts of the frame structure are extended closer to the rear side of the tractor than the lower end portions thereof and the roof is offset rearward correspondingly thereto.

However, with the work vehicle of JP6-032188 A, the control section including the steering wheel is positioned forwardly relative to the roof, so that the steering wheel or the driver's hands gripping this steering wheel may be exposed to e.g. raindrops. Further, the driver's hands gripping this steering wheel or the like may be exposed to direct sunbeam. Hence, the construction invites new problem that roof cannot fully achieve its object of protecting the driver from raindrops, sunbeam or the like.

In view of the above-described problems, an object of the present invention is to provide a canopy device for use in a work vehicle, which device can ensure proper front-upper vision of the driver from the vehicle body while this driver is seated at the driver's seat and which can also provide appropriate protection for the driver against sunbeam, raindrops, etc.

SUMMARY OF THE INVENTION

For accomplishing the above-noted object, the present invention has the following characterizing feature. Namely, A work vehicle comprising:
a front loader mounted at a front portion of the work vehicle to be vertically pivotable;
a driving control device;
a canopy device for covering the driving control device from above, the canopy device including a roof disposed upwardly of the driving control device and a support body for supporting the roof; and
wherein said roof includes a front visor portion which projects, in a plan view thereof, to a position same as or more forwardly of a front end portion of the driving control device;
to a lower face of said front visor portion, there are attached a pair of right and left front illumination lamps, and there is provided an upper concave portion at the right/left center thereof; and
a lower face of said upper concave portion is formed as an inclined face which is inclined upward from a rear portion to a front edge of the front visor portion so as to be located at a higher position than the attaching position of the front illumination lamps.

With this construction, as the front visor portion of the roof projects to a position same as or more forwardly of a front end portion of the driving control device, the exposure of the driver's hands gripping this steering wheel or the like to raindrops or sunbeam can be minimized.

Further, with the upper concave portion formed in the front visor portion of the roof, it becomes possible to increase the elevation angle of the view of the driver operating the driving control device. Therefore, it becomes possible to set the line of view of the driver toward a position higher than the roof to a position closer to the vehicle body of the tractor or the like. As a result, it becomes possible to ensure sufficient view to the front upper side for the driver.

According to one preferred embodiment, when the front loader is pivoted to the uppermost position, the inclined face of the upper concave portion is located more upwardly of an upward view line from an operating space of the driving control device toward the leading end of the front loader.

With this construction, when the driver is seated at the driver's seat, this driver's view line looking at the leading end of the front loader set at its uppermost position is not blocked by the roof, so that the driver can reliably see this leading end through the upper concave portion. Hence, the front loader can be operated in a safer and more accurate manner.

According to one preferred embodiment, the roof has a center-elevated shape and an upper face of the roof corresponding to the upper concave portion of the front visor portion has an upward curved bulging shape and is located at the same level as the highest level of the roof.

With this construction, it becomes possible to provide the upper concave portion in the front visor portion of the roof without increasing the highest level of the roof. Hence, it becomes possible to avoid enlargement of the canopy device.

Further and other features and advantages of the invention will become apparent upon reading the following description with reference to the accompanying drawings.

Incidentally, it is understood that, unless indicated otherwise explicitly, the direction of the vehicle body traveling straight forward (forward traveling) will be referred to as "front/rear direction" used as a reference and the horizontal direction normal to this front/rear direction will be referred to as "right/left direction" (or lateral direction), and the direction perpendicular to both the front/left direction and the right/left direction will be referred as "vertical direction", respectively.

DESCRIPTION OF THE PREFERRED EMBODIMENTS

One preferred embodiment of the present invention will be described hereinafter with reference to the accompanying drawings.

Figure 1:
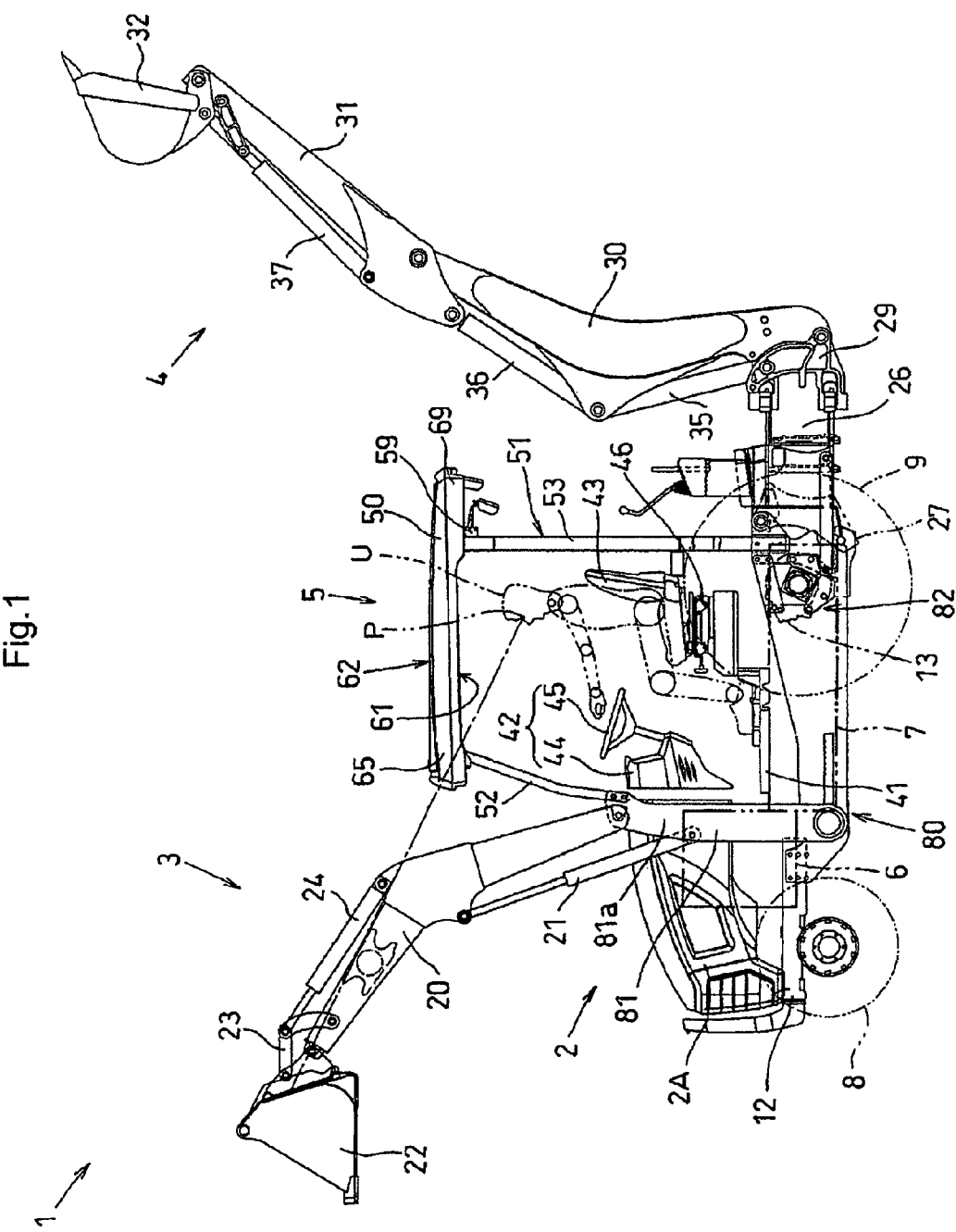
FIG. 1 is an overall left side view of a work vehicle according to one embodiment of the present invention.

As shown in FIG. 1, a work vehicle 1 according to this embodiment is a work vehicle so-called a TLB (a tractor with a front loader and a backhoe), wherein a front loader (an implement) 3 is detachably attached to a front portion of a tractor 2 and a backhoe 4 is detachably attached to a rear portion of the same.

The front loader 3 employed is a brace-less front loader.

Further, the work vehicle 1 includes a canopy device 5 having a four-post ROPS (Roll-Over Protective Structure) including a FOPS (Falling-Object Protective Structure) function.

A vehicle body 2A of the tractor 2 includes a front-mounted engine 6, and a transmission case 7 directly coupled to the rear portion of this engine 6 and is supported on a pair of right and left front wheels 8 and a pair of right and left rear wheels 9 so as to be capable of traveling.

The transmission case 7 includes a clutch housing connected to the rear portion of the engine 6 via a flywheel housing, etc.; a gearbox connected to a rear end of the clutch housing and formed integrally with or separately from the clutch housing, etc.

To a lower portion of right/left sides of the engine 6, there is attached and fixed, with e.g. a plurality of bolts, a front axle frame 12 which extends forwardly from the side of the engine 6.

Further, at a rear portion of the tractor body 2A, there is attached and fixed, with e.g. a plurality of bolts, a rear axle case 13 which projects outward in the right/left direction from the right and left sides of the transmission casing. To this rear axle case 13, right/left rear axles rotatably driven by the power from the engine 6 are supported to be rotatable about a right/left axis, and the rear wheels 9 are mounted on the respective rear axles.

On the right/left positions of the work vehicle 1 inward of the respective rear wheels 9, there are disposed fenders 15 for covering the rear wheels 9. Between the right and left pair of fenders 15 and upwardly of the transmission case 7, there is mounted a driving control device 40, and the canopy device 5 is mounted to cover this driving control device 40 from above.

The tractor body 2A includes an attaching frame 80, and this attaching frame 80 has its front portion attached and fixed to the front axle frame 12 and has its rear portion attached and fixed to the rear axle case 13. At a front portion of this attaching frame 80, there are provided masts 81 which project upward. And, the front loader 3 is attached to a loader attaching portion (an implement attaching portion) provided at an upper portion of each mast 81, and at a rear portion of the attaching frame 80, the backhoe 4 is attached. Further, to this attaching frame 80, there is supported the canopy device 5 surrounding the driving control device 40.

Figure 7:
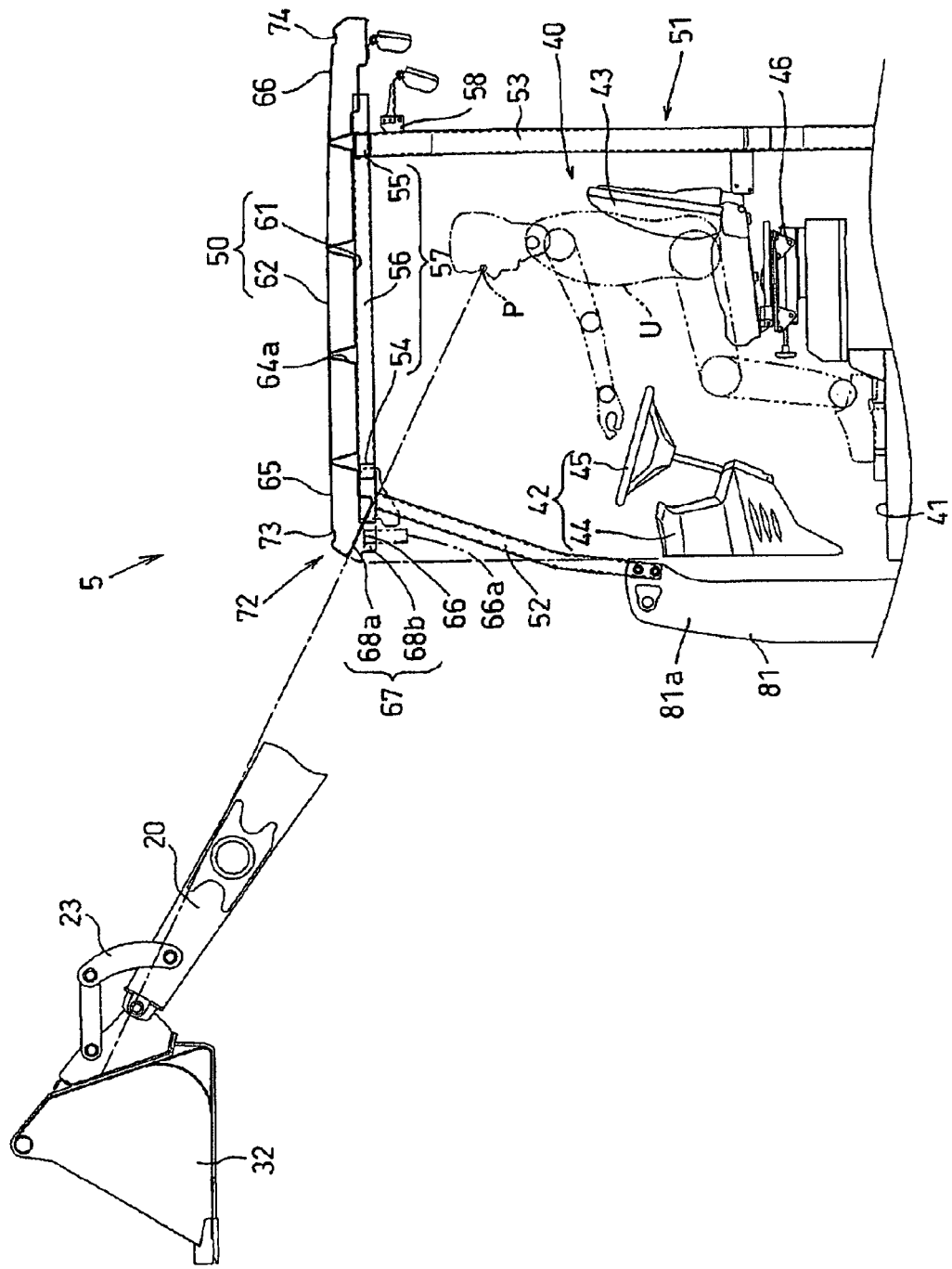
FIG. 7 is a left side view illustrating a line of sight of the driver seated at the driver's seat.

As shown in FIG. 1 and FIG. 7, the driving control device 40 includes a floor sheet 41 mounted on the transmission case 7, a control portion 42 mounted on the floor sheet 41 and rearwardly and upwardly of the engine 6, and a driver's seat 43 mounted rearwardly of the control portion 42.

The control portion 42 is used mainly for controlling the tractor body 2A and the front loader 3 and includes a front console cover 44 having a meter panel, etc., and a steering wheel 45 projecting rearward from the front console cover 44.

The driver's seat 43 is supported to be pivotable about a vertical axis via a pivot rotation device 46 mounted on the floor sheet 41 so as to be switchable between a front facing posture for operating the tractor 2 and/or the front loader 3 and a rear facing posture for controlling the backhoe 4.

The canopy device 5 includes a roof 50 positioned upwardly of the driving control device 40 and a support body 51 supporting the roof 50 and surrounding the driving control device 40.

Figure 5:
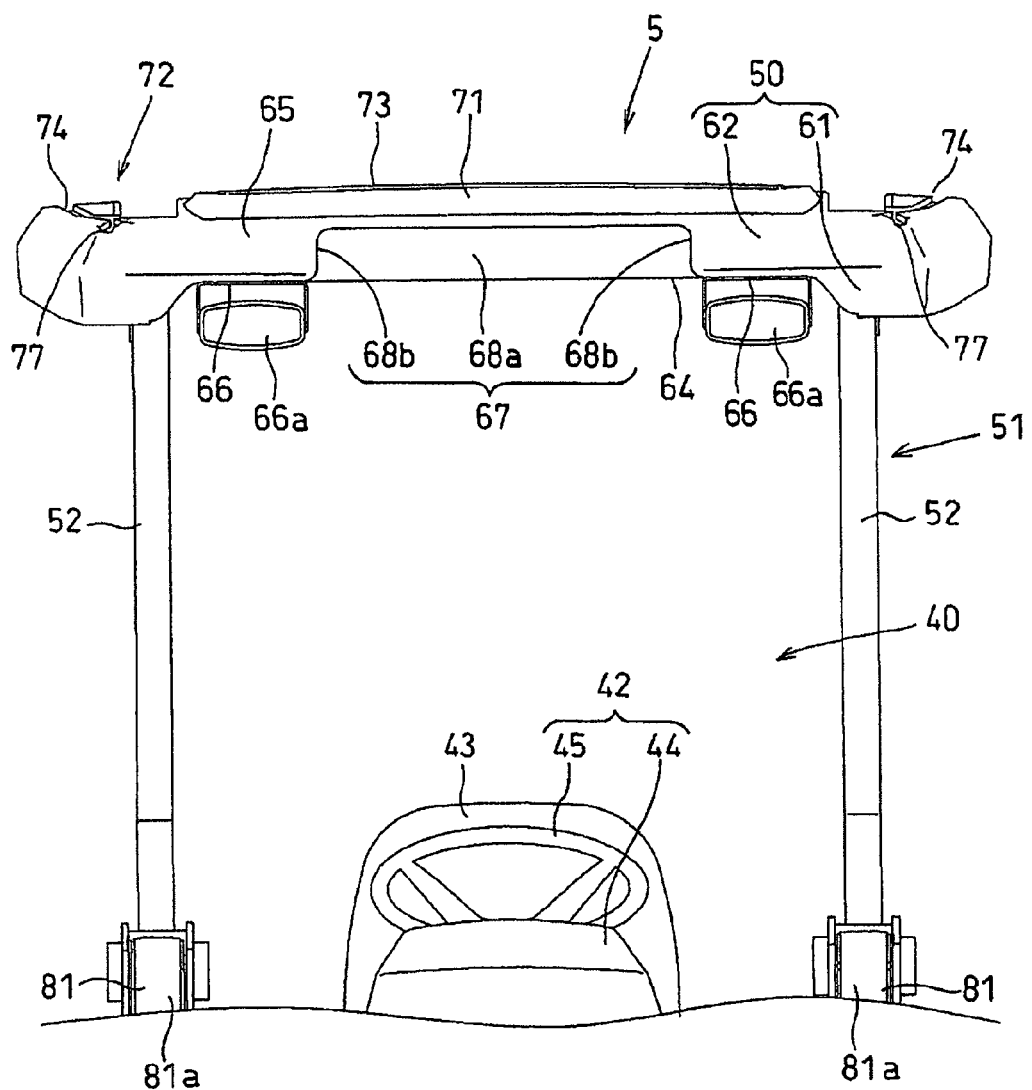
FIG. 5 is a front view of a canopy device.
Figure 6:
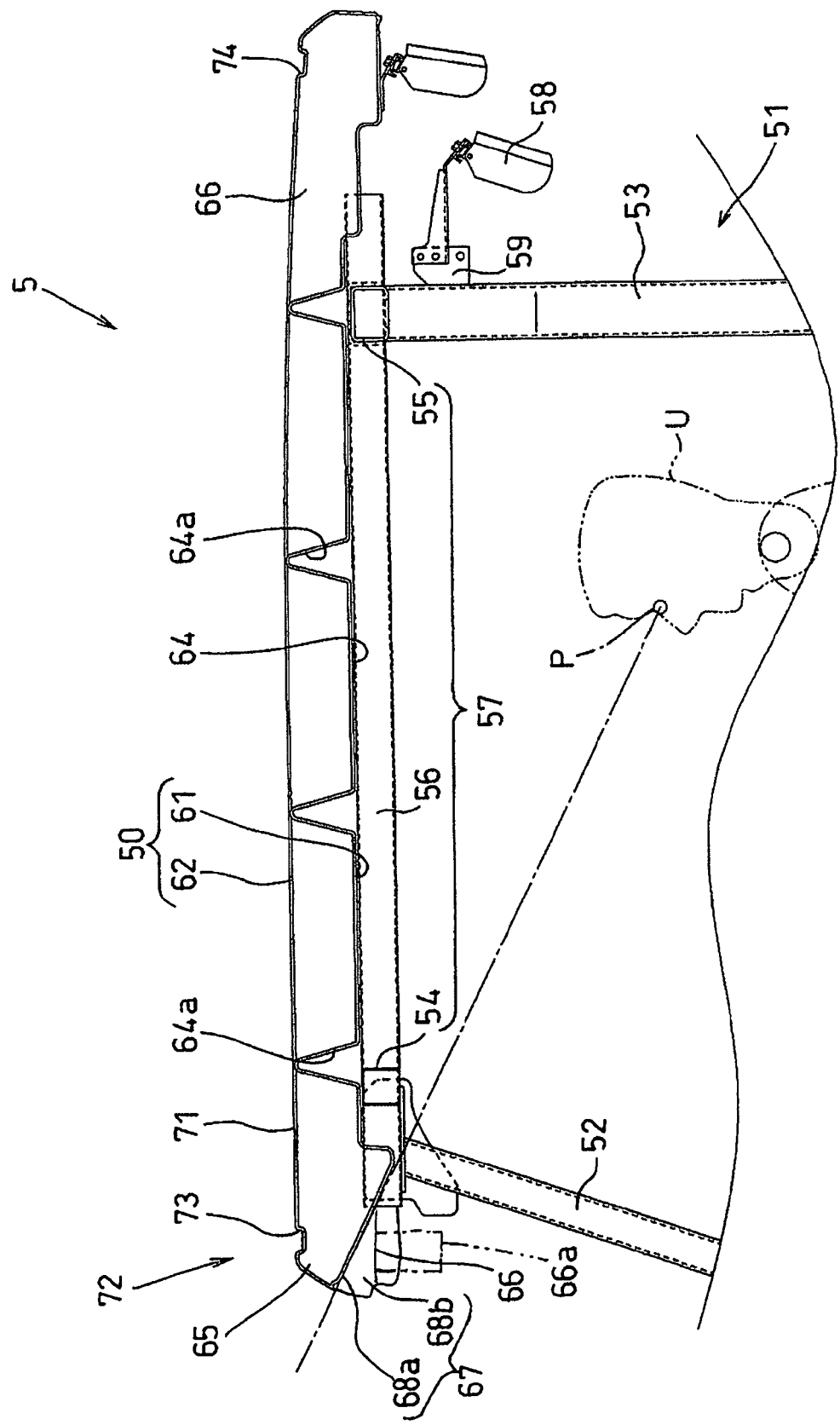
FIG. 6 is a side view showing an upper portion of the canopy device.

As shown in FIGS. 5-7, the support body 51 has a box-like shape and includes a pair of right and left front posts 52 disposed at front portions and a pair of right and left rear posts 53 disposed at rear portions, and further includes an upper front frame 54 interconnecting upper ends of the pair of right and left front posts 52, an upper rear frame 55 interconnecting upper ends of the pair of right and left rear posts 53, and a pair of right and left upper frames 56 interconnecting the upper ends of the front and rear posts 52, 53 disposed on the same right/left side. The upper front frame 54, the upper rear frame 55 and the pair of right and left upper frames 56 together constitute an upper frame structure 57.

Each of the pair of right and left front posts 52 have a lower end thereof connected via fasteners such as bolts, to the upper end of the mast 81 and is bent at vertically intermediate portions thereof to extend with rearward upward inclination toward the rear portion of the tractor body 2A as it extends upward. Further, each front post 52, as being attached to the mast 81, has its lower end located forwardly of the front console cover 44 of the driving control device 40 and has its upper end located upwardly of the front console cover 44 and slightly forwardly of the leading end of the steering wheel 45.

Each rear post 53 is located rearwardly of the front post 52 located on the same side and extends vertically with its lower end connected via fasteners such as bolts, to a post attaching portion 82 formed at the rear end of the attaching frame 80. Further, each rear post 53 is located rearwardly of the driver's seat 43 of the driving control device 40 and has its upper end bent toward the right/left inner side and connected to the upper rear frame 55. The height position of the upper end of the rear post 53 is about same as the height position of the rear end of the front post 52. And, at the upper end of each rear post 53, there is provided, as a projection, a bracket portion 59 supporting a rear work lamp 58.

The upper front fame 54, the upper frames 56 and the upper rear frame 55 are formed each of an angular member having a straight center axis. Further, since the height positions of each front post 52 and each rear post 53 are same as described above, the upper front frame 52, the upper frames 56 and the upper rear frame 55 are supported, with their center axes oriented substantially horizontal, between the front posts 52 and the rear posts 53.

Figure 4:
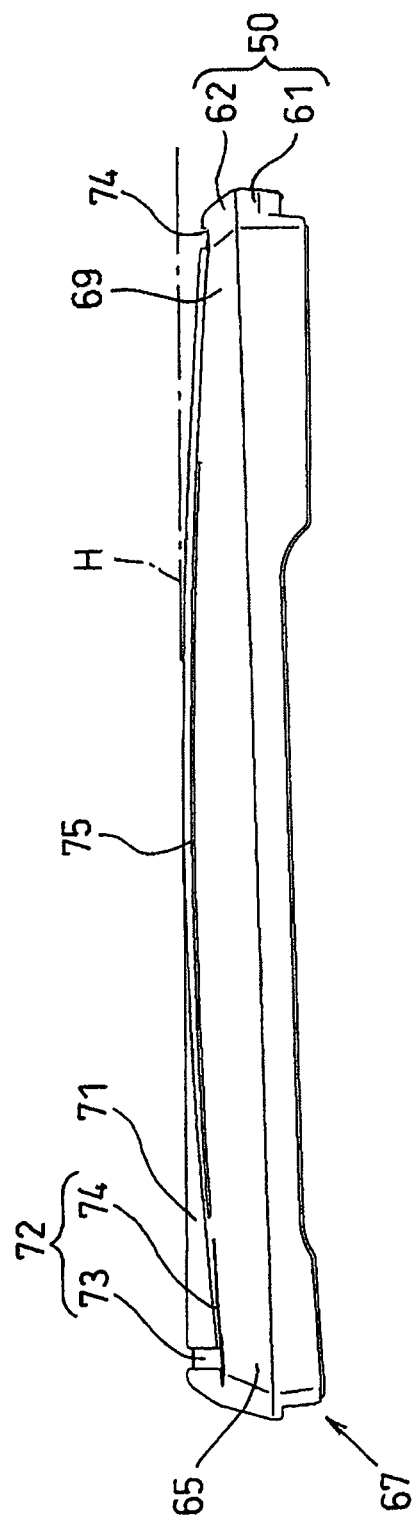
FIG. 4 is a left side view of the roof.

As shown in FIGS. 4 and 6, the roof 50 mounted atop the support body 51 is formed as a hollow structure by blow molding of e.g. a synthetic resin, and includes an inner roof portion 61 which forms the roof back face side (lower face side) of the roof and an outer roof portion 62 which forms the roof front face side (upper face side) of the roof.

Figure 2:
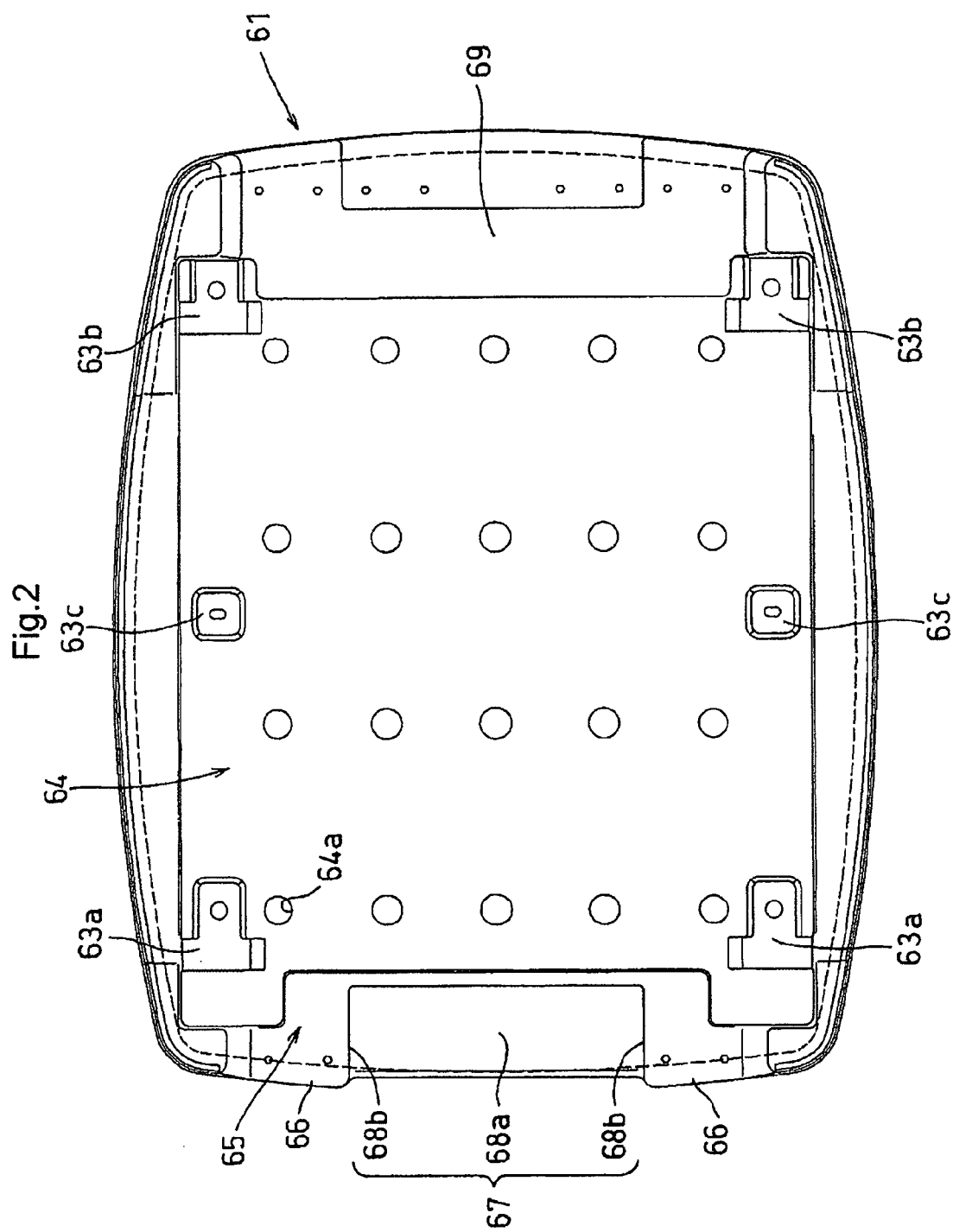
FIG. 2 is a plan view showing an inner roof portion of a roof.

As shown in FIG. 2, the inner roof portion 61 includes a pair of right and left front connecting portions 63a connected to right/left connecting portions of the support body 51 for the upper front frame 54 and the right/left upper frames 56; a pair, of right and left rear connecting portions 63b connected to connecting portions of the support body 51 for the upper rear frame 55 and the right/left upper frame 56; and, between the right and left front connecting portions 63a and the right and left rear connecting portions 63b, a pair of intermediate connecting portions 63c connected to intermediate portions of the right/left upper frames 56.

Further, the inner roof portion 61 includes a horizontal-face like flat portion 64 located at a central region thereof extending from the pair of right and left front connecting portions 63a to the pair of right and left rear connecting portions 63b. This flat portion 64 forms a plurality of (in this embodiment, twenty) projections 64a projecting toward the outer roof portion 62. As these plural projections 64a support the outer roof portion 62, this prevents the outer roof portion 62 from getting dented due to an external load or shock and enhances the strength of the roof 50 as a whole.

Incidentally, it is also possible to form these inner roof portion 61 and outer roof portion 62 as separate components, so that the roof 50 may be formed by placing the outer roof portion 62 over the inner roof portion 61.

As shown in FIG. 7, the roof 50 further includes a front visor portion 65 which projects more forwardly than the front connecting portions 63a connected to the upper front frame 54 of the support body 51. This front visor portion 65 has such a projecting length that, when this portion 65 is disposed upwardly of the support body 51, its front edge may be located at substantially same front/rear position as the front end of the front console cover 44 of the driving control device 40. With this, the control portion 42 of the driving control device 40 may entirely be located immediately below the roof 50, thereby minimizing exposure of this control portion 42 to raindrops and sunbeam.

As shown in FIGS. 5 and 6, although a lower end of the front visor portion 65 bulges more downward than the flat portion 64, this is formed upwardly concave from the position forwardly of each front post 52 (from a rear portion of the front visor portion 65). To lower opposed sides of the front visor portion 65, there are horizontally provided attaching portions 66 acting as positions for attaching front illumination lamps 66a suspended therefrom. At right/left center portion which is between these right and left pair of attaching portions 66, there is formed an upper concave portion 67 extending to an even higher position than the right and left attaching portions 66.

A lower face of the upper concave portion 67 includes an inclined face 68a which is upwardly inclined as it extends from the rear portion of the front visor portion 65 toward a front edge of the same so as to be located higher than the right and left attaching portions 66; and a pair of right and left interconnecting portions 68b for smoothly connecting the respective right/left side of the inclined face 68a with the attaching portion 66 on the same side.

As shown in FIGS. 6 and 7, the inclined face 68a of the upper concave portion 67 is formed with an forwardly upward inclination to the front edge of the front visor portion 65, with the position opposed to the inner side of the upper end of each front post 52 being its rear lower end. So that, the inclined face 68a is located upwardly of a straight line extending from a visual viewpoint P of a driver U seated at the driver's seat 43 to the leading end of the front loader 3 set at its uppermost position. Further, the inclined face 68a has an inclination angle along the above straight line relative to the horizontal plane.

Further, the roof 50 includes a rear visor portion 69 projecting more rearward than the rear connecting portions 63b connected to the upper rear frame 55 of the support body 51.

Figure 3:
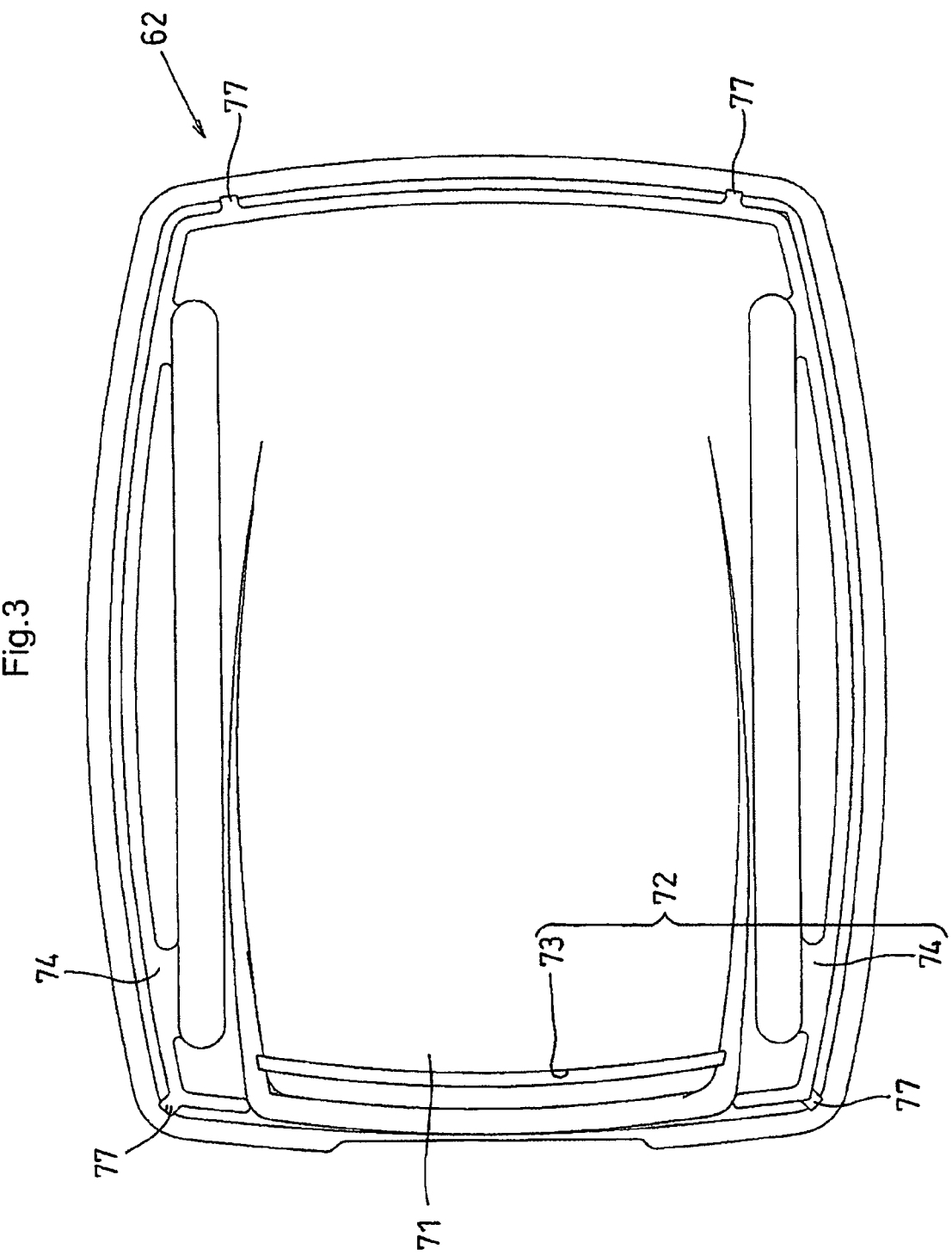
FIG. 3 is a plan view showing an outer roof portion of the roof.

As shown in FIGS. 3 and 4, the outer roof portion 62 has a center-elevated shape and includes a front bulging portion 71 which bulges upward in correspondence with the upper concave portion 67 of the front visor portion 65. The front bulging portion 71 has its right/left center portion acting as the front visor portion 65 bulging and curved upward, and the height position of its top being set at the same height as a center-elevated portion H of the outer roof 62 shown by a one-dot-and-one-dash line in FIG. 4. With this, although the upper face of the outer roof portion 62 has the front bulging portion 71, it is possible to provide the upper concave portion 67 in the front visor portion 65 for improved visibility, without increasing the maximum ground-height of the work vehicle 1. Further, as the rear portion of the outer roof portion 62 is inclined downward toward the rear side, raindrops fallen on the front bulging portion 71 will flow also toward the rear portion of the outer roof portion 62, thus providing efficient water drainage for the front bulging portion 71.

As shown in FIG. 3, the outer roof portion 62 defines a water drainage trench 72 for efficient drainage of raindrops fallen on the roof 50 along an outer peripheral edge thereof. This water drainage trench 72 includes a first trench portion 73 formed at the front upper portion of the front bulging portion 71 along the right/left direction and a second trench portion 74 extending along the lateral edges and the rear edge of the outer roof portion 62.

Further, in the second trench portion 74, there are formed draining portions 77 at positions right/left outer obliquely forwardly of the pair of right and left front posts 72 of the support body 51 and rearwardly of the rear posts 53, so that rain water flown in the second trench portion 74 will be drained through these draining portions 77 from the roof 50. Between these draining portions 77 and the driver U seated at the driver's seat 43, the front posts 52 and the rear posts 53 are located, so that the water falling from the draining portions 77 is shielded from the driver's field of view by the presence of the front posts 52 and the rear posts 53. Hence, the falling water will not enter the view of the driver U to decrease the visibility.

As shown in FIG. 1, referring to the front loader 3, a boom 20 attached to a loader attaching portion 81a of the mast 81 to be pivotable about a right/left axis and a boom cylinder 21 interposed between this boom 20 and the mast 81 are provided in pair on the right and left sides at the front portion of the tractor 2, and to the front ends of the right and left booms 20, there is connected a bucket 22 to be pivotable about a right/left axis. Between the boom 20 and the bucket 22, there is provided a bucket cylinder 24 via a link mechanism 23.

One end of the boom cylinder 21 is pivotally connected to a vertical intermediate portion of the front side of the mast 81 to be pivotable about a right/left axis, and the other end of the boom cylinder 21 is pivotally connected to a longitudinal intermediate portion of the lower face side of the boom 20 to be pivotable about a right/left axis. In operation, in response to expansion/contraction of the boom cylinder 21, the boom 20 is pivoted vertically, and in response to expansion/contraction of the bucket cylinder 24, the bucket 22 is operated for scooping/dumping operation.

The backhoe 4 includes a base 26, a pair of right and left attaching bodies 27 fixed to its front portion, a control device 28 mounted on the base 26, a swivel bracket 29 mounted at a rear portion of the base 26 to be pivotable to the right or left about a vertical axis, a boom 30 pivotally supported to the swivel bracket 29 via a lateral shaft to be pivotable about a right/left axis, an arm 31 pivotally attached to the leading end of the boom 30 to be pivotable about a further right/left axis, and a bucket 32 attached to the arm 31 to be operable for a scooping/dumping operation.

Further, the base 26 includes a swivel cylinder (not shown) for pivoting the swivel bracket 29 to the right or left. Between the swivel bracket 29 and the boom 30, there is interposed a boom cylinder 35 for pivoting the boom 30 vertically. Between the boom 30 and the arm 31, there is interposed an arm cylinder 36 for pivoting the arm 31. And, between the arm 31 and the bucket 32, there is interposed a bucket cylinder 37 for moving the bucket 32.

Figure 8:
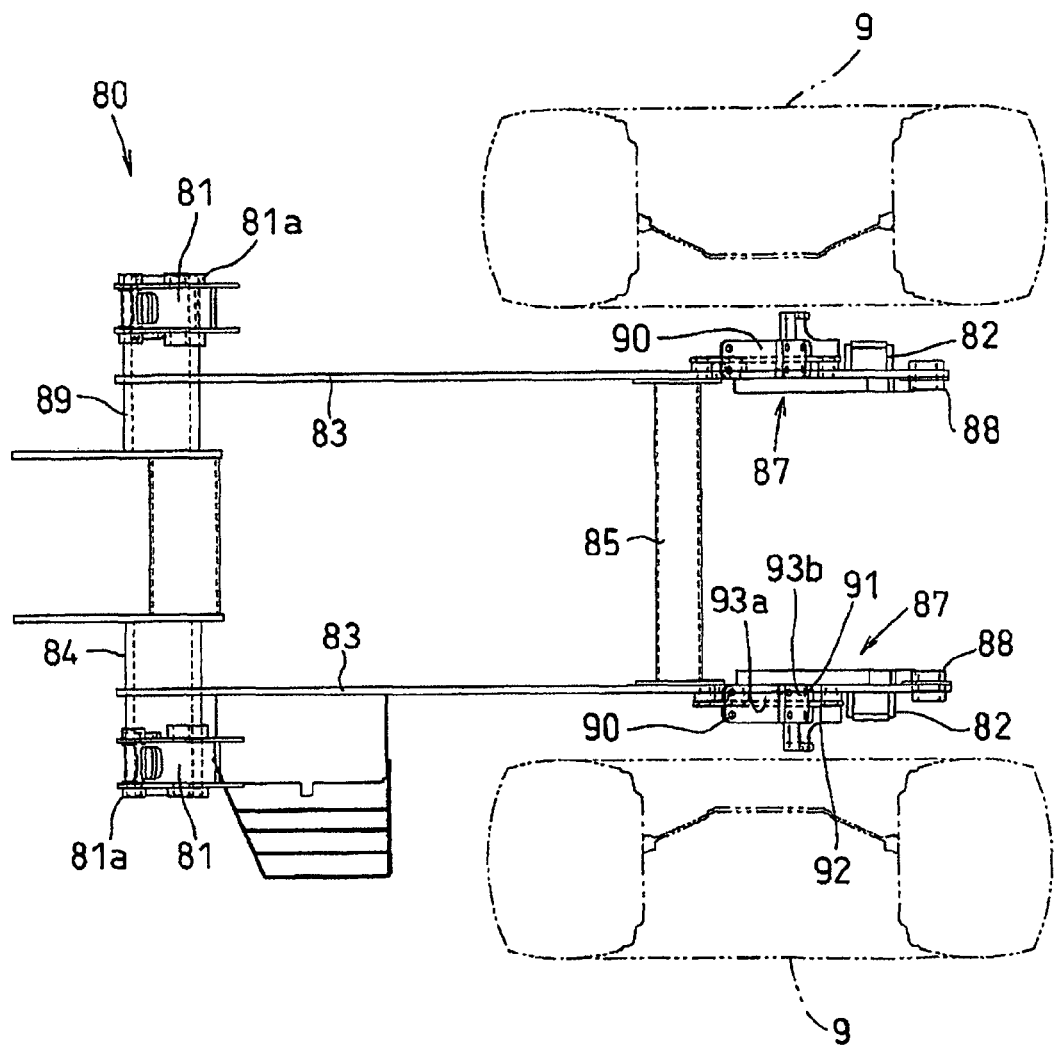
FIG. 8 is a plan view of an attaching frame.
Figure 9:
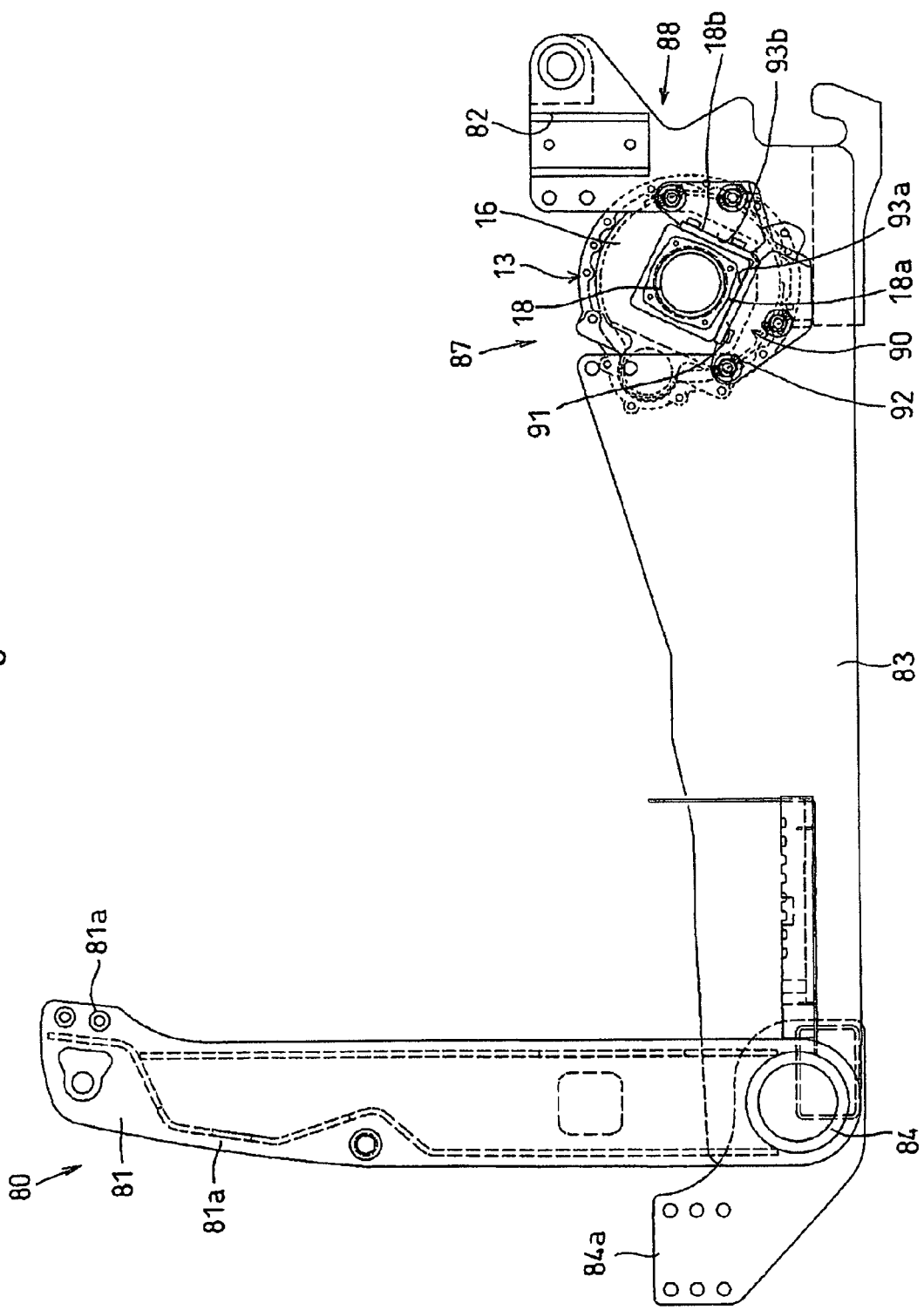
FIG. 9 is a left side view of the attaching frame.

As shown in FIG. 1, FIG. 8 and FIG. 9, the attaching frame 80 includes a pair of right and left main frames 83 on the right and left opposed sides of the vehicle body 2A of the tractor 2 and disposed from the rear lateral sides of the engine 6 to the lateral side of the transmission case 7.

Each of the right and left main frames 83 is formed of a single plate member and has a shape whose vertical width progressively increased toward the rear side.

To the front portion of each main frame 83, a support base 84 formed of a cylindrical body having a right/left axis extends therethrough in the right/left direction and fixed thereto by means of e.g. welding. And, to the right/left inner side of each support base 84, an attaching bracket (front attaching portion) 84a is fixed by means of e.g. welding as a projection projecting forwardly and upwardly therefrom.

Further, the front portion of the attaching bracket 84a is disposed on the right/left outer side of the front axle frame 12 and fixedly attached thereto by bolts or the like.

The rear portions of the right and left main frames 83 are interconnected via a rear interconnecting member 85 disposed in the right/left direction downwardly of the transmission case 7 and forwardly of the rear axle case 13 and formed of an angular pipe member or the like.

At the right/left outer end of each support base 84, there is provided, in the form of an upper projection, the mast 81 having a loader attaching portion 81a for detachable attachment of the boom 20 of the front loader 3.

As shown in FIGS. 7 and 9, at the upper end of the mast 81 and at a position upwardly of the loader attaching portion 81a, the lower end of the front post 52 of the support body 51 of the canopy device 5 is inserted and fixedly attached by means of a pin, a bolt, or the like.

As shown in FIG. 9, at a rear portion of each right/left main frame 83, there is provided a rear axle case attaching portion 87 for attaching this main frame 83 to the rear axle case 13 of the tractor vehicle body 2A. Rearwardly of the rear axle case attaching portion 87, there is provided a post attaching portion 82 for allowing and attaching the rear end of the rear post 53 of the canopy device 5. Rearwardly of the post attaching portion 82, there is provided a backhoe attaching portion 88 for attachment of the backhoe 4.

Figure 10:
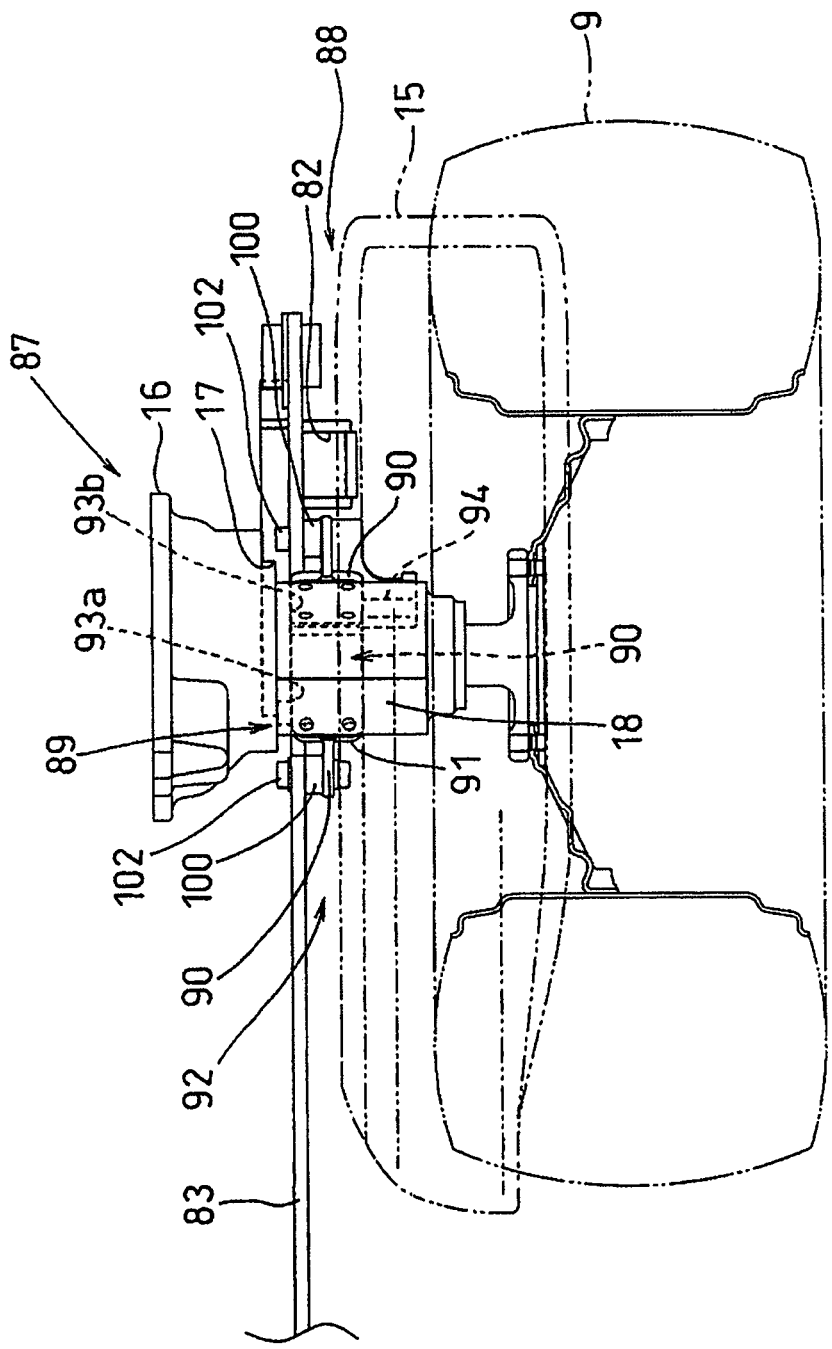
FIG. 10 is a plan view showing, in an enlarged scale, an attached condition of a main frame to a rear axle case.

As shown in FIG. 10, the rear axle case 13 has right/left inner side portions thereof each formed as a lid portion 16 for covering a brake case attached to a rear lateral side portion of the transmission case 7, and a support portion 18 is formed as a right/left outer projection from this lid portion 16 via an engaging portion 17 having a cylindrical outer shape.

Figure 14:
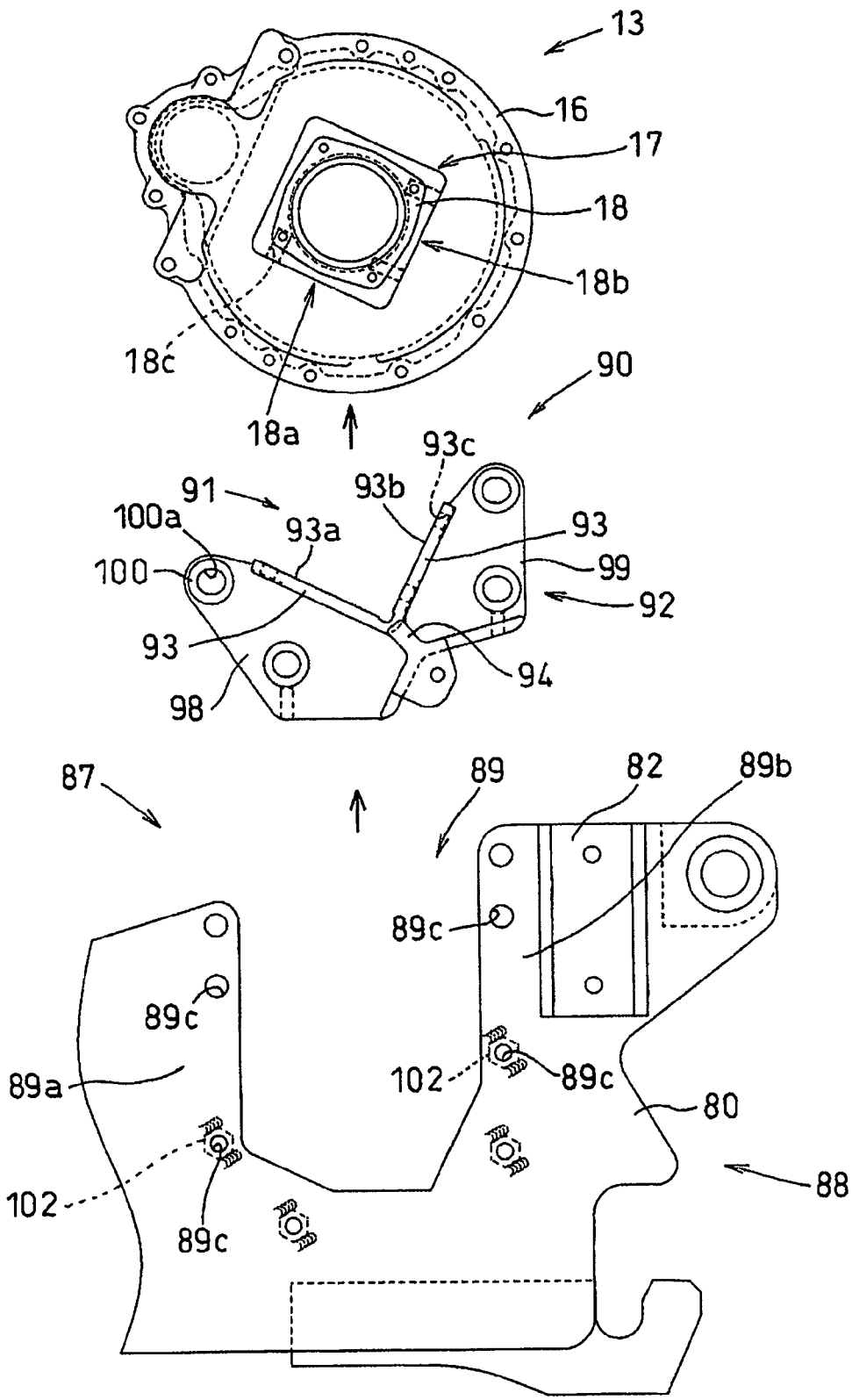
FIG. 14 is a left side view showing the rear axle case, the attaching tool and the attaching frame in exploded states.

As shown in FIGS. 9 and 14, the support portion 18 of the rear axle case 13 is a portion to which the rear axle case attaching portion 87 of the main frame 83 is attached, thus supporting the main frame 83 thereto, and this support portion 18 is formed in the form of a square column having a right/left axis, with its lower front face (contact face) 18a and its lower rear face (contact face) 18b being formed planar. Further, each of these faces 18a, 18b defines one pair or a plurality of pairs of bolt fastening holes 18c normal to the respective faces 18a, 18b.

Further, the rear axle case 13 is disposed such that the lower front face 18a is inclined to extend progressively downward toward the rear side thereof and the lower rear face 18b is inclined to extend progressively downward toward the front side thereof. With this, the lower front face 18a and the lower rear face 18b are inclined relative to the horizontal plane.

As shown in FIG. 14, the rear axle case attaching portion 87 of the main frame 83 forms an upwardly open concave forming portion 89 to be engaged with the engaging portion 17 of the rear axle case 13 from under, thereby to extend the rear axle case 13 through the main frame 83.

At a front portion 89a and a rear portion 89b of the concave forming portion 89 of the main frame 89, there are formed a plurality of bolt inserting holes 89c along the vertical direction.

Between the concave forming portion 89 of the main frame 83 and the rear axle case attaching portion 66, there is provided an attaching tool 90, so that the main frame 83 is attached via this attaching tool 90 to the rear axle case 13.

Figure 11:
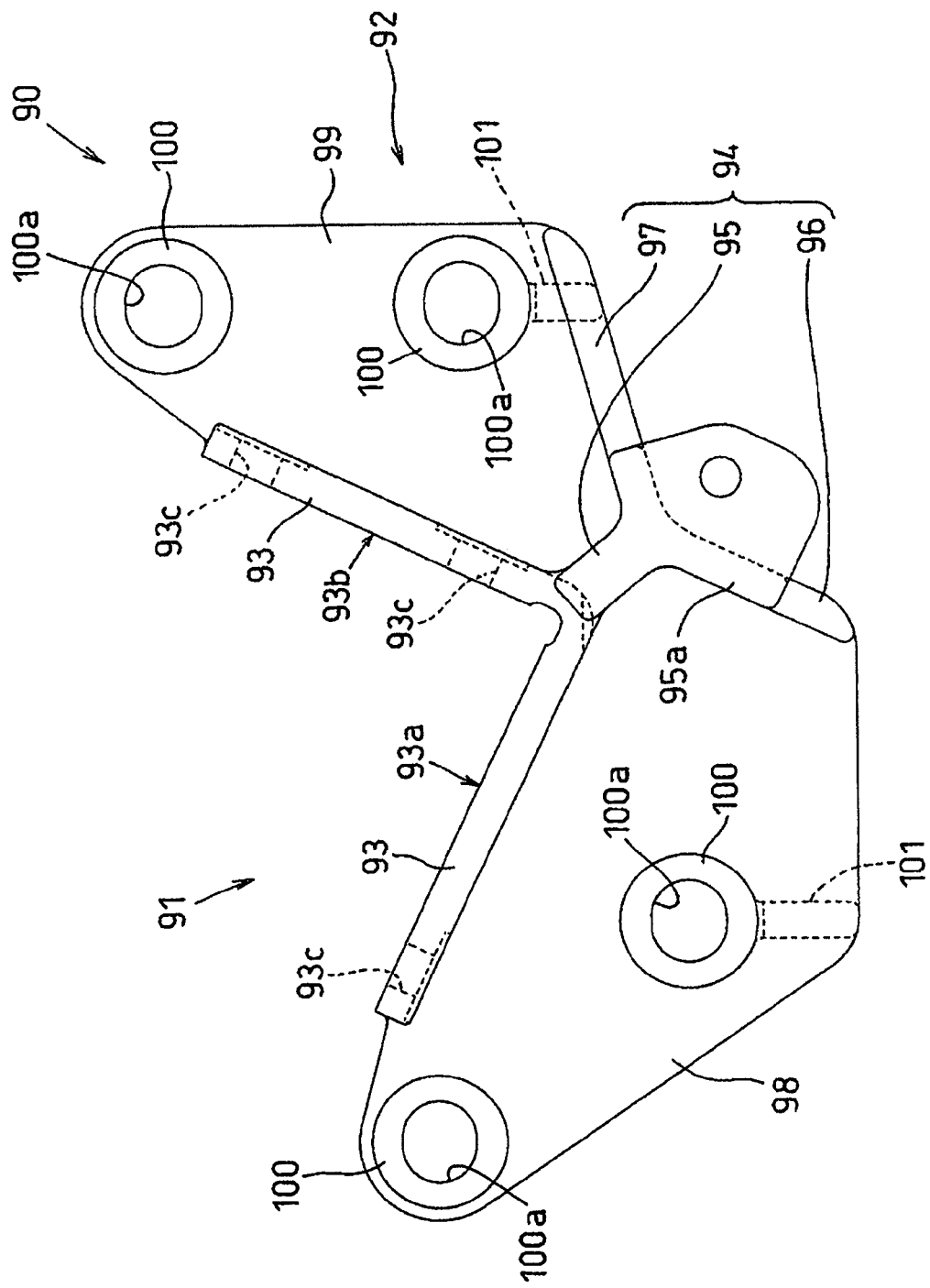
FIG. 11 is a left side view of an attaching tool.
Figure 12:
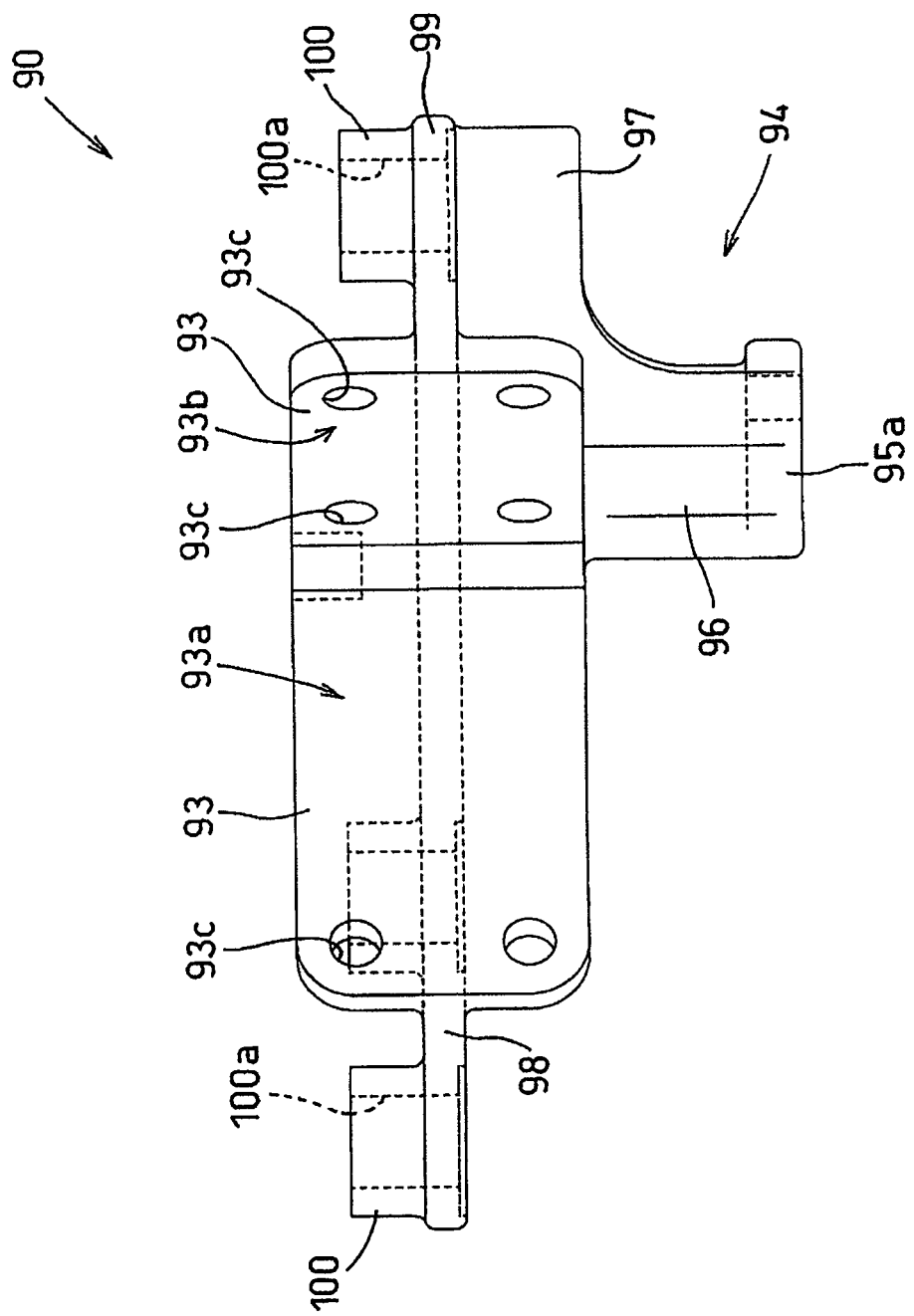
FIG. 12 is a plan view of the attaching tool.
Figure 13:
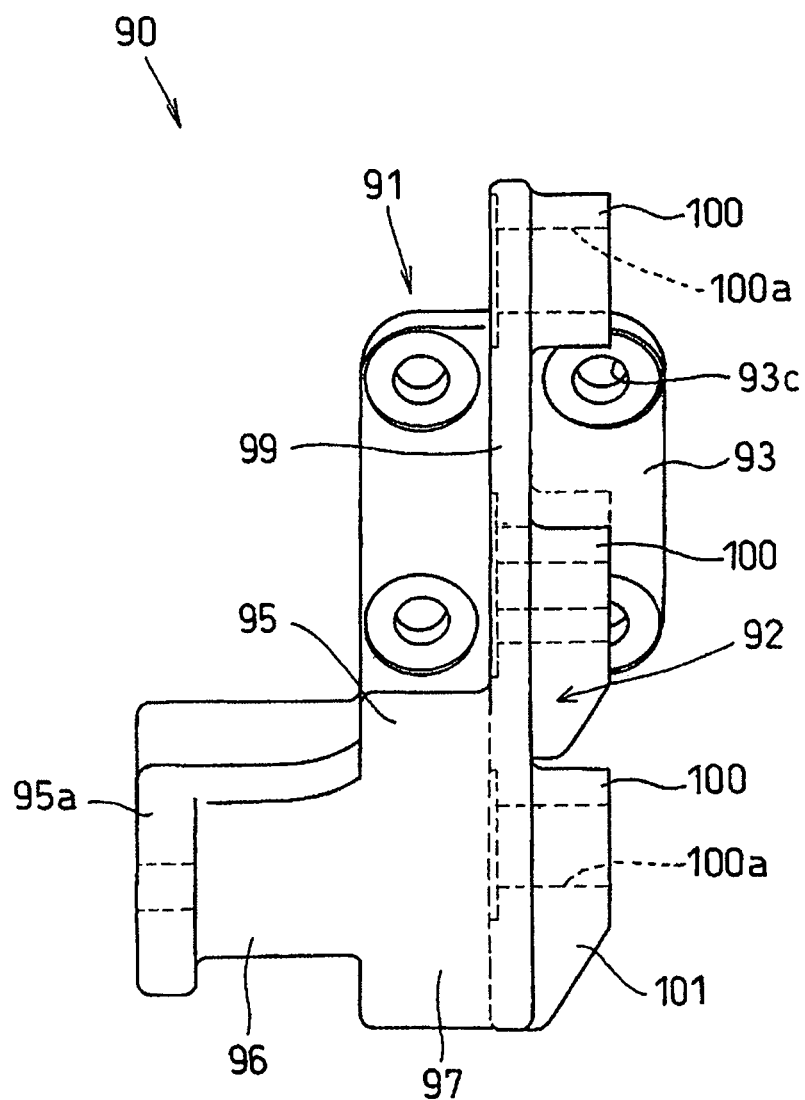
FIG. 13 is a rear view of the attaching tool.

As shown in FIGS. 11-13, this attaching tool 90 is formed as a cast product having integrally a rear axle side connecting portion 91 to be connected to the rear axle case 13 and a frame side connecting portion 92 to be connected to the main frame 83, respectively.

The rear axle side connecting portion 91 is formed in the form of a V-shape to which a planar plate-like portion 93 is connected substantially perpendicularly and includes a pair of front and rear seat faces 93a, 93b in face-contact with the lower front face 18a and the lower rear face 18b (a pair of contact faces) of the support portion 18 of the rear axle case 13.

Referring to the pair of front and rear seat faces 93a, 93b, the front seat face 93a is formed with progressively upward inclination toward the front side of the main frame 83 and the rear seat face 93b is formed with progressively upward inclination toward the rear side of the main frame 83. Further, the front seat face 93a can be placed in face-contact with the lower front face 18a of the support portion 18 of the rear axle case 13 and the rear seat face 93b can be placed in face-contact with the lower rear face 18b of the support portion 18 of the rear axle case 13, respectively.

Further, these front and rear seat faces 93 are constructed such that when the front seat face 93a is placed in face-contact with the lower front face 18a of the support portion 18 of the rear axle case 13, the rear seat face 93b is placed in face-contact with the lower rear face 18b. Therefore, when the support portion 18 of the rear axle case 13 is engaged with the rear axle side connecting portion 91 of the attaching tool 90, the lower front face 18a of the support portion 18 comes into contact with the front seat face 93a of the rear axle side connecting portion 91 and also the lower rear face 18b of the support portion 18 comes into contact with the rear seat face 93b of the rear axle side connecting portion 91. Therefore, by only engaging the support portion 18 with the rear axle side connecting portion 91, positioning of this support portion 18 relative to the rear axle side connecting portion 91 can be effected very easily.

Further, as the two lower faces 18a, 18b of the support portion 18 come into face-contact respectively with the two seat faces 93a, 93b of the rear axle side connecting portion 91, it is possible to sufficiently restrict occurrence of looseness of the attaching tool 90 relative to the rear axle case 13 when the support portion 18 of the rear axle case 13 is engaged with the rear axle side connecting portion 91 of the attaching tool 90.

Further, the front seat face 93a defines, at positions opposed to the pair of bolt fastening holes 18c formed at the lower front face 18a of the support portion 18, a pair of right and left through holes 93c. Also, the rear seat face 93b defines, at positions opposed to the pair of bolt fastening holes 18c formed at the lower rear face 18b of the support portion 18, a pair of right and left through holes 93c.

At the connecting portion of the pair of plate-like portions 93 of the rear axle side connecting portion 91, there is formed a reinforcing rib 94 at a position opposite to the seat face 93. This rib 94 includes a main rib portion 95 formed along the connecting portion, a front rib portion 96 extending obliquely from the main rib portion 95 toward the forward lower side, and a rear rib portion 96 extending obliquely from the main rib portion 95 toward the rear upper side. Further, at the outer end portion of the main rib portion 95, there is provided a check chain attaching portion 95a for attaching a check chain for checking movement of a lower link (not shown) of a three-point link mechanism attached to a rear portion of the tractor vehicle body 2A.

The frame side connecting portion 92 includes a plate-like front connecting portion 98 to be connected to the front side portion 89a of the concave forming portion 89 of the main frame 83 and a plate-like connecting portion 99 to be connected to the rear side portion 89b (the concave opening side) of the same.

Further, the front side connecting portion 98 is formed like a plate having a plate face extending along the right/left direction and is formed by continuously connecting the right/left center portion of the plate-like portion 93 having the front seat face 93a of the rear axle side connecting portion 91, and the main rib portion 95 and front rib portion 96 of the rib 94. Further, the front end of the front connecting portion 98 projects more forwardly than the plate-like portion 93 having the front seat face 93a of the rear axle connecting portion 91. Further, the front connecting portion 98 includes, at the front end and at a lower end thereof downwardly of the plate-like portion 93, boss portions 100 having bolt inserting holes 100a along the right/left direction. Further, at the lower boss portion 100, there is provided a reinforcing rib 101 in the form of a downward projection.

Incidentally, at the front portion 89a of the concave forming portion 89 of the main frame 83, a bolt fixing nut 102 is fixed by means of e.g. welding, at the bolt inserting hole 89 provided at the position of the front connecting portion 98 of the attaching tool 90 in opposition to the boss portion 100.

Further, the rear side connecting portion 99 is formed like a plate having a plate face extending along the right/left direction and is formed by continuously connecting the right/left center portion of the plate-like portion 93 having the rear seat face 93b of the rear axle side connecting portion 91, and the main rib portion 95 and rear rib portion 97 of the rib 94. Further, the rear end of the rear connecting portion 99 projects more rearwardly and upwardly than the plate-like portion 93 having the rear seat face 93b of the rear axle connecting portion 91. Further, the rear connecting portion 99 includes, at the rear end and at a lower end thereof between the plate-like portion 93 and rear rib portion 97, boss portions 100 having bolt inserting holes 100a along the right/left direction. Further, at the lower boss portion 100, there is provided a reinforcing rib 102 in the form of an upward projection.

Incidentally, at the rear portion 89b of the concave forming portion 89 of the main frame 83, a bolt fixing nut 102 is fixed by means of e.g. welding, at the bolt inserting hole 89c provided at the position of the rear connecting portion 99 of the attaching tool 90 in opposition to the boss portion 100.

The pair of seat faces 93 of the rear axle side connecting portion 91 of the attaching tool 90 and the planar face of the frame side connecting portion 92 extend normal to each other. Further, the contact face of each boss portion 100 which comes into face-contact with the main frame 83 is formed parallel with the planar face of the frame side connecting portion 92, so that this contact face and the pair of seat faces 93 extend normal to each other.

Figure 16:
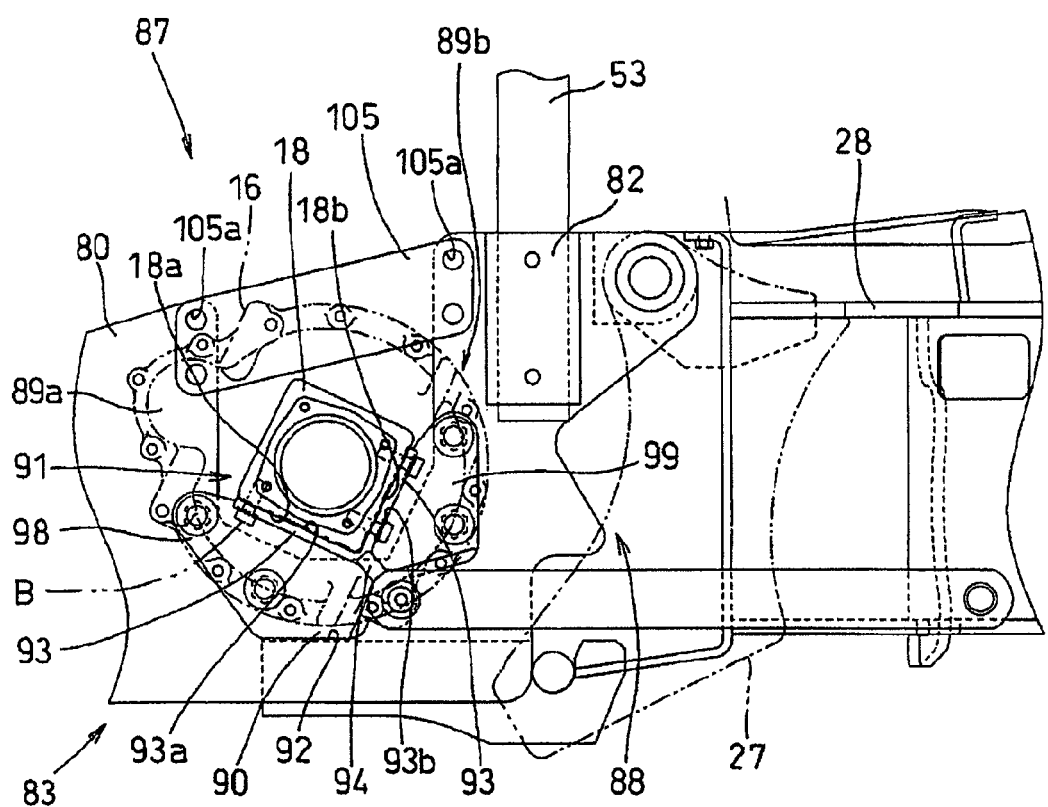
FIG. 16 is a left side view showing, in an enlarged scale, the attached condition of the main frame to the rear axle case.

Further, as shown in FIG. 16, the front side portion 89a and the rear side portion 89b of the concave forming portion 89 of the main frame 83 have their lower ends interconnected via the frame side connecting portion 92 of the attaching tool 90 and have their upper ends interconnected via the connecting plate 105.

Referring to the connecting plate 105, its front end portion can be overlapped in right/left direction with the upper end portion of the front side portion 89a and its rear end portion can be overlapped in right/left direction with the upper end portion of the rear side portion 89b, and includes through holes 105a at positions opposed to the plurality of bolt inserting holes 89c of the respective side portions 89a, 89b.

Figure 15:
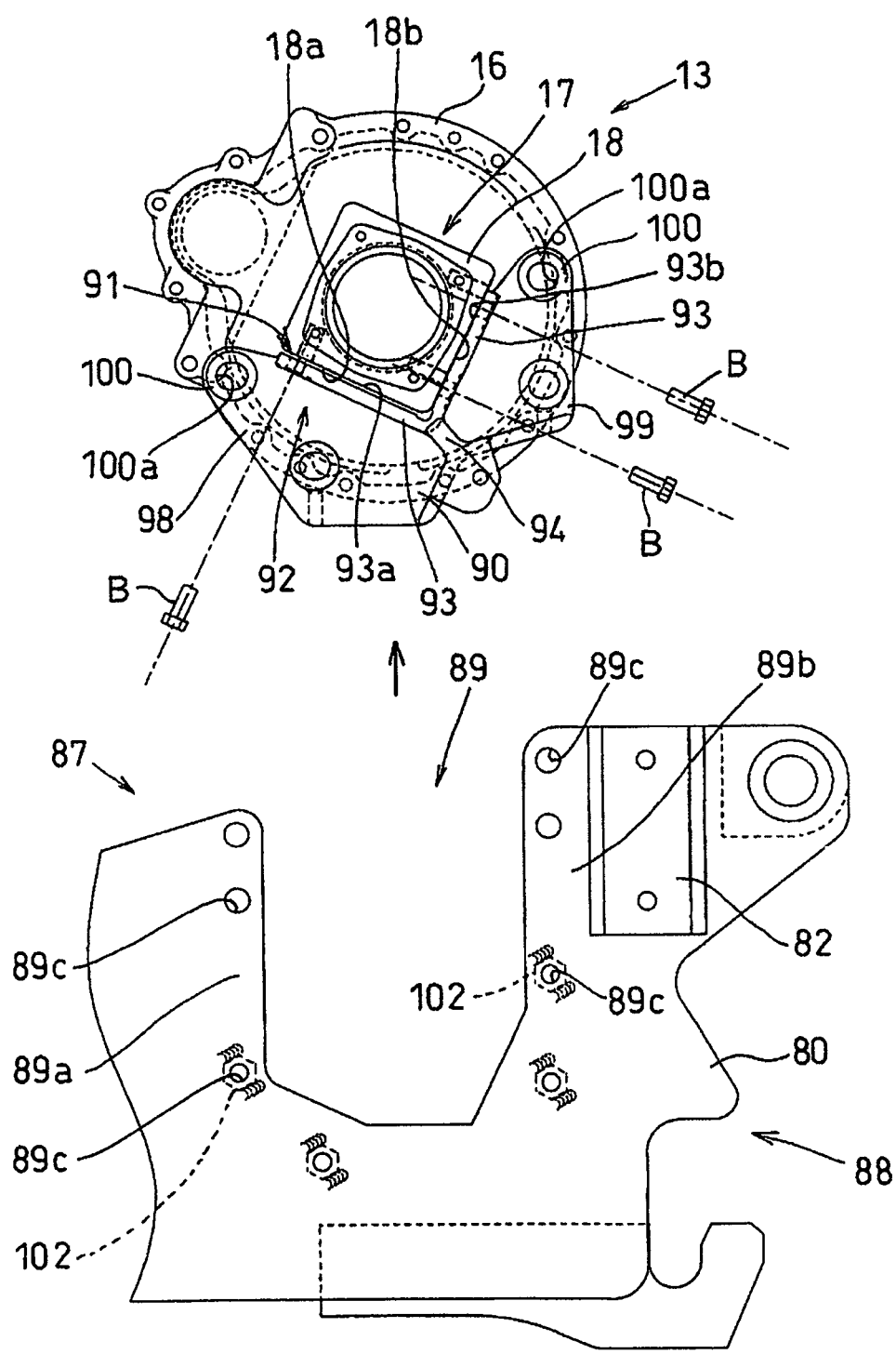
FIG. 15 is a left side view showing a connected condition between the rear axle case and the attaching tool.

In order to attach the main frame 83 to the rear axle case 13, first, as illustrated in FIG. 14 and FIG. 15, the rear axle side connecting portion 91 of the attaching tool 90 will be engaged with the engaging portion 17 of the rear axle case 13 from under side thereof and the lower front face 18a of the support portion 18 of the rear axle case 13 will be placed into contact with the front seat face 93a of the rear axle side connecting portion 91 and also the lower rear face 18b of the support portion 18 will be placed in contact with the rear side. In this, as the angle between the pair of seat faces 93 is 90 degrees and the angle between the lower front face 18a and the lower rear face 18b is also 90 degrees, by only engaging the rear axle connecting portion 91 from under the support portion 18 of the rear axle case 13, at the same time when the lower front face 18a of the support portion 18 of the rear axle case 18 comes into face contact with the front seat face 93a of the rear axle side connecting portion 91, the lower front face 18a of this support portion 18 will come into face contact with the rear face. Hence, these positioning operations of the attaching tool 90 to the rear axle case 13 can be carried out very easily.

Then, into the pair of bolt inserting holes 93c formed in the front seat face 93a of the rear axle side connecting portion 91, bolts with head B will be inserted respectively and then threaded with the bolt fastening holes 18c defined in the lower front face 18a of the support portion 18 of the rear axle case 13, and also into the pair of bolt inserting holes 13c formed in the rear seat face 93b of the rear axle side connecting portion 91, bolts with head B will be inserted respectively and then threaded with the bolt fastening holes 18c defined in the lower rear face 18b of the support portion 18 of the rear axle case 13, With the above, the attaching tool 90 is fastened to the support portion 18 of the rear axle case 13.

Next, from the lower side of the support portion 18 of the rear axle case 13, the rear portion of the main frame 83 will be brought closer to engage the support portion 18 with the concave forming portion 89, in this, the respect boss portions 100 of the frame side connecting portion 92 of the attaching tool 90 will be brought into opposition to the bolt inserting holes 89c having the nuts 102 of the front side portion 89a and rear side portion 89b of the concave forming portion 89 of the main frame 83. Then, bolts with head are inserted in the respective boss portions 100 ad fasted in the bolt inserting holes 80c. With this, the main frame 83 can be attached to the attaching tool 90 and the main frame 83 can be connected to the rear axle case 13 via this attaching tool 90.

Lastly, the connecting plate 105 will be disposed upwardly of the support portion 18 of the rear axle case 13 engaged downwardly (to a deep position) of the concave forming portion 89 of the main frame 83 and this connecting plate 105 will be connected via fastening tools, such as bolts, to the main frame 83. This completes the attachment of the main frame 83 to the rear axle case 13 as illustrated in FIG. 16.

Incidentally, it is also possible to temporarily retain the attaching tool 90 to the concave forming portion 89 by temporarily fastening the fasteners for fastening the attaching tool 90 to the concave forming portion 89 of the main frame 83. Then, by engaging the rear axle side connecting portion 91 of the attaching tool 90 under this condition with the rear axle case 13, the support portion 18 of the rear axle case 13 and the rear axle side connecting portion 91 of the attaching tool 90 will be fastened and then the fasteners fastening the attaching tool 90 and main frame 83 together will be fastened fully.

With the attachment of the main fame 83 to the rear axle case 13 by the above-described process, the two lower faces 18a, 18b of the support portion 18 can be placed in equally firm face-contact with the pair of seat faces 93a, 93b of the rear axle connecting portion 91 of the attaching tool 90, thus effectively preventing occurrence of "one-sided contact" of the contact between one of the two lower faces 18a (18b) and the seat face 93a (93b) being looser than that between the other. As a result, there, is ensured appropriate load transmission between these lower faces 18a, 18b and the seat faces 93a, 93b. And, it becomes possible to restrict inadvertent loosening of the fasteners such as bolts for maintaining these lower faces 18a, 18b and the seat faces 93a, 93b under the face-contact with each other. And, fatigue of the contact faces due to such loosening can be restricted also.

Further, as the attaching tool 90 is formed by casting, this can be manufacture with extremely high precision, thus maintaining appropriate tolerance required for the fastening of the fasteners such as bolts. As such high-precision attaching tools 90 can be manufactured in mass scale, in manufacturing a plurality of work vehicles 1, the attachment condition of the main frame 83 to the rear axle case 13 can be maintained with high precision in each and every work vehicle 1.

As described above, since the rear axle case 13 and the attaching tool 80 are fastened to each other by means of fasteners such as bolts and the main frame 83 and the attaching tool 90 too are fastened to each other by means of fasteners such as bolts, even when there is a slight error in the attachment between the rear axle case 13 and/or main frame 83 and the attaching tool 90, such an error can be compensated for by fastening the attaching tool 90. As a result, the attachment of the attaching tool 90 to the rear axle case 13 and main frame 83 can be maintained appropriately.

With the above-described attachment construction of the main frame 83, as the contact faces (upper face and lower face) of the support portion 18 of the rear axle case 13 are formed planar and the rear axle case 13 is arranged such that these contact faces are inclined relative to the horizontal plane, the load in the front/rear direction applied to the main frame 83 from the front loader 3 or the backhoe 4 can be vertically distributed at the attaching portions of the main frame 83 to the rear axle case 13. And, as the vertical load can be dispersed in the front/rear direction, the stress applied to the attaching portions of the main frame 83 to the rear axle case 13 can be effectively dispersed.

With the above-described embodiment, as the front visor portion 65 of the roof 50 projects forwardly to the position substantially same as the front edge of the driving control portion 42, the driving control device 40 including a driver U seated at the driver's seat 43 can be properly protected from sunshine, raindrops, etc. Further, as the upper concave portion 67 is formed in the front visor portion 65, good visibility for the driver U to the front upper side can be assured and the visibility for the driver U can be assured by the upper concave portion 67 even when the bucket 32 of the front loader 3 is located at its uppermost position. The roof 50 does not interfere with the line of view for the driver U looking at the bucket 32. So, the driver U, at his/her normal driving posture, can operate with visually confirming the bucket 32, whereby the operational efficiency can be improved.

Moreover, according to the present embodiment, with the relative engagement of the attaching tool 90 to the rear axle case 13 from its underside, the positioning of the rear axle case 13 relative to the attaching tool 90 can be effected with precision, and the attachment of these rear axle cases 13 to the attaching tools 90 can be carried out very easily and precisely. With this, the efficiency of the attaching operation of the main frame 83 (attaching frame 81) to the rear axle case 13 is improved and also, the attachment of the main frame 83 to the rear axle case 13 can be maintained with high precision. As a result, the load transmission between the rear axle case 13 and the main frame 83 can be effected appropriately. As a result, no fatigue or the like will occur in the contacting faces between the rear axle case 13 and the attaching tool 90 and between the attaching tool 90 and the main frame 83, and loosening in these attachments can be minimized.

The foregoing has explained an embodiment of the present invention in details. However, the present invention is not limited to the foregoing embodiment. For instance, the pair of front and rear seat faces 93a, 93b need not necessarily be continuous with each other. Instead, these may be spaced apart from each other in the form of reverse mutually widening layout as long as these are provided as seat faces 93a, 93b corresponding to the respective lower faces of the support portion 18 of the rear axle case 13. Further, what is required for the support portion 18 of the rear axle case 13 is having the lower faces 18a, 18b which come into face-contact with the pair of front and rear seat faces 93a, 93b of the rear axle side connecting portion 91 of the attaching tool 90. As long as this requirement is met, the portion can have a polygonal column shape, such as a hexagonal or octagonal column, or this can have such as shape as interconnecting, via a curved face, the ends of these paired lower faces 18a, 18b.

Moreover, instead of the above-described TLB, the work vehicle 1 can be a front loader vehicle having only a loader at its front portion.

What we claim is:

1. A work vehicle comprising:
    a front loader mounted at a front portion of the work vehicle to be vertically pivotable;
    a driving control device; and
    a canopy device for covering the driving control device from above, the canopy device including a roof disposed upwardly of the driving control device, and a support body for supporting the roof, the support body including a pair of right and left posts standing erect from the work vehicle, and an upper frame structure provided at respective upper ends of the right and left posts and supporting said roof extending thereover, said upper frame structure including an upper front frame and an upper rear frame each extending in a right/left direction, and a pair of right and left upper side frames each extending in a front/rear direction and connected to respective ends of the upper front frame and the upper rear frame;

wherein said upper front frame is connected to each of said right and left upper side frames at a position rearwardly of a front end of the upper side frame associated therewith, and said right and left posts are connected to said right and left upper side frames, respectively, at a position forwardly of said upper front frame;

said roof includes a front visor portion which projects to a position more forwardly of the upper front frame of the upper frame structure;

the front visor portion includes a right attaching portion and a left attaching portion each extending horizontally at respective positions inwardly of said right and left posts, and an upper concave portion positioned inwardly of the right attaching portion and the left attaching portion;

and said upper concave portion is formed from an inclined face and right and left interconnecting portions, the right and left interconnecting portions connecting respective right and left sides of the inclined face to the right attaching portion and the left attaching portion such that the right and left interconnecting portions are positioned substantially perpendicular to the right and left attaching portions, and the inclined face is inclined upward from a rear portion to a front edge of the front visor portion.

2. The work vehicle according to claim 1, wherein when the front loader is pivoted to the uppermost position, the inclined face of the upper concave portion is located more upwardly of an upward view line from an operating space of the driving control device toward the leading end of the front loader.

3. The work vehicle according to claim 1, wherein the roof has a center-elevated shape; and an upper face of the roof corresponding to the upper concave portion of the front visor portion has an upward curved bulging shape and is located at the same level as the highest level of the roof.

4. The work vehicle according to claim 1, wherein said upper concave portion is formed in a region of the front visor portion extending between a portion opposed to an upper end of the front support body and the front edge of the front visor portion.

5. The work vehicle according to claim 1, wherein said roof comprises a hollow roof formed of resin, said roof having a peripheral lower face extending outwardly of said upper frame structure and to a level lower than an upper face of said upper frame structure, and wherein said inclined face of said upper concave portion has a rear lower edge positioned more forwardly than the upper front frame of the upper frame structure and more downwardly than an upper face of the upper front frame.

6. The work vehicle according to claim 1, wherein said roof includes an inner roof portion which forms a lower face side of the roof and an outer roof portion which forms an upper face side of the roof;

said outer roof portion has an upper face inclined downward from a front/rear center portion toward a rear side;

a water drainage trench is formed in said outer roof portion, and includes a pair of right and left water drainage trenches extending along respective lateral edges of the upper face;

said outer roof portion includes a front bulging portion extending inwardly of the right and left water drainage trenches and bulging more upwardly to a level higher than respective front ends of said right and left water drainage trenches; and said front bulging portion bulges upwardly over a width greater than a lateral width of said upper concave portion, said front bulging portion having a bulging apex thereof set substantially at a same level as the front/rear center portion of said outer roof portion.

7. The work vehicle according to claim 1, wherein said front visor portion has right and left edges extending downward to respective positions lower than said upper front frame of said upper frame structure; and wherein each of the right attaching portion and the left attaching portion is positioned substantially at a same level as said upper front frame, and the upper concave portion is positioned at a higher level than the right attaching portion and the left attaching portion.

* * * * *